United States Patent [19]

Samuels et al.

[11] Patent Number: 5,466,773
[45] Date of Patent: Nov. 14, 1995

[54] LIQUID CRYSTALLINE POLYESTER RESIN

[75] Inventors: Michael R. Samuels, Wilmington; Marion G. Waggoner, Hockessin, both of Del.

[73] Assignee: E. I. du Pont de Nemours and Company, Wilmington, Del.

[21] Appl. No.: 396,032

[22] Filed: Feb. 28, 1995

[51] Int. Cl.[6] .................................................. C08G 63/18
[52] U.S. Cl. ........................ 528/194; 528/193; 528/206; 528/219; 528/272; 528/298; 528/302; 528/308; 528/308.6
[58] Field of Search ..................... 528/193, 194, 528/206, 219, 272, 298, 302, 308, 308.6

[56] References Cited

U.S. PATENT DOCUMENTS

| | | | |
|---|---|---|---|
| 4,777,204 | 10/1988 | Ikenaga et al. | 524/439 |
| 5,085,807 | 2/1992 | Okamoto et al. | 252/609 |
| 5,107,953 | 4/1992 | Shimizu et al. | 181/282 |
| 5,278,278 | 1/1994 | Okamoto et al. | 528/190 |
| 5,360,647 | 11/1994 | Sumida | 428/1 |
| 5,364,669 | 11/1994 | Sumida et al. | 428/1 |

*Primary Examiner*—Samuel A. Acquah

[57] ABSTRACT

Novel thermotropic liquid crystalline polyesters derived from t-butylhydroquinone, terephthalic acid, 2,6-naphthalene dicarboxylic acid and 4-hydroxybenzoic acid are described. These polymers are useful as molding resins.

6 Claims, No Drawings

LIQUID CRYSTALLINE POLYESTER RESIN

FIELD OF THE INVENTION

The present invention relates to liquid crystalline polymers containing units derived essentially from t-butylhydroquinone, terephthalic acid, 2,6-naphthalene dicarboxylic acid and 4-hydroxybenzoic acid, and which are useful as molding resins.

TECHNICAL BACKGROUND

Thermotropic liquid crystalline polymers (LCPs) are commercially available thermoplastic resins. They are useful as molding resins for various parts such as electrical connectors, automotive parts, and others, and for other uses such as films. Although a large number of compositions are known in the art, polymers having good physical or other properties and/or lower cost are always desirable.

U.S. Pat. Nos. 4,664,972, 4,749,769 and 4,778,927 describe liquid crystalline polyesters containing repeat units derived from t-butylhydroquinone (TBHQ) and other monomers. All of these patents require the presence of additional repeat units compared to the instant polymers.

SUMMARY OF THE INVENTION

This invention concerns a thermotropic liquid crystalline polymer consisting essentially of the repeat units

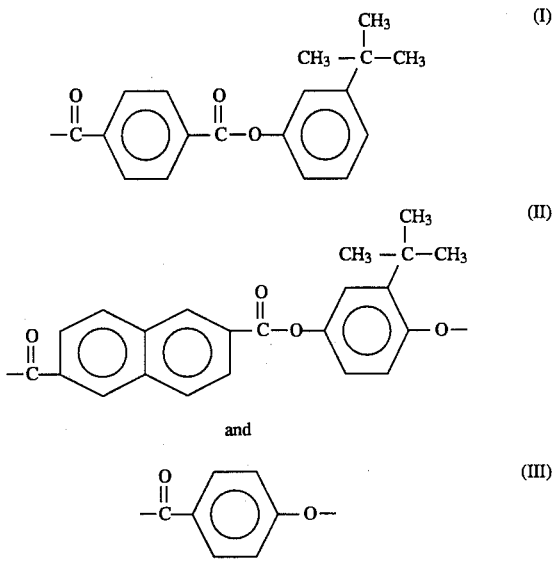

wherein:

the molar ratio of (I):(II) is about 1:9 to about 9:1; and the molar ratio of [(I)+(II)]:(III) is about 4:1 to about 2:3.

DETAILS OF THE INVENTION

The LCP described herein contains essentially the three repeat units shown above. Unit (I) is derived from TBHQ and terephthalic acid (TA), unit (II) is derived from TBHQ and 2,6-naphthalene dicarboxylic acid (NDA), and unit (III) is derived from 4-hydroxybenzoic acid (HBA). In preferred LCPs, the molar ratio of (I):(II) is about 4:1 to about 1:4, more preferably about 3:1 to about 1:3. In preferred LCPs the molar ratio of [(I)+ (II)]:(III) is about 3:1 to about 2:3.

The instant LCPs can be made by conventional methods known to the skilled artisan for making aromatic polyesters. For instance, the acetate esters (or other lower alkyl ester) of the hydroxyl groups in the basic monomers may be mixed with the diacids and heated, while gradually removing byproduct acetic acid, to eventually form the desired polymer. In a variation of this procedure, the acetates can be formed in situ by adding a stoichiometric amount of acetic anhydride to a mixture of all the monomers, and then the condensation polymerization is carried out. Alternatively, the phenyl esters of the carboxylic acid groups in the monomers may be reacted with the hydroxyl groups, while removing byproduct phenol by distillation. In both cases, the reactants are usually heated above 300° C. under vacuum to achieve a desirable polymer molecular weight. The Example below illustrates this procedure.

The polymers disclosed herein may be mixed or compounded with a variety of materials normally mixed with thermoplastics, such as fillers and/or reinforcers such as glass fibers, glass spheres, glass flakes, carbon fiber, carbon blacks, mineral fillers, pigments, colorants, stabilizers, other polymers, tougheners, antioxidants, and plasticizers.

Many of the polymers herein are amorphous. By "amorphous" is meant that the polymers have no melting point when measured by Differential Scanning Calorimetry (DSC) at a heating rate of 25°/min, or have a melting point with a heat of melting of less than 1 J/g. The melting point (Tm) is taken as the peak of the melting endotherm, while the glass transition temperature (Tg) is taken as the midpoint of the DSC transition. Many of the polymers described herein exhibit a Tg above about 150° C.

EXAMPLE

To a three-liter kettle was added 327.5 g of TBHQ, 229.1 g of TA, 127.8 g NDA and 272.1 g of HBA. Then 613 mL of acetic anhydride was added. A Hastalloy® stirring agitator was placed in the kettle and guided through the kettle top via a Teflon® bushing equipped with an o-ring for a pressure tight fit. The entire kettle was then slid into rubber-surfaced U-shaped clamps and tightened securely. Nitrogen was supplied to the vessel via a safety bubbler and controlled by a needle valve to insure an $N_2$ atmosphere. A one-piece 2.5 cm O.D. glass column, water condenser with splitter, and 2-liter graduated cylinder were then attached. Stirring was started at 60 rpm until a good visual mix of monomers and acetic anhydride was obtained (approximately 1–2 minutes), then slowed to 50 rpm.

Next a 170° C. pre-heated metal bath composed of bismuth and tin was raised to cover the reaction portion of the vessel allowing for heating and acetylation of the ingredients while reflux took place in the vessel. The stirring was kept at 50 rpm. After about 40 minutes, the acetic acid distillate was removed via a splitter on the reflux column, and the temperature of the metal bath was increased about 20° C. every 20 minutes until the temperature reached 310° C. After about 20 minutes at 310° C., the set temperature was increased to 335° C. to drive off residual acetic acid and maintain a molten resin as it was later finished under vacuum.

After greater than 90% recovery of expected acetic acid, the glass column, condenser, and graduated cylinder were removed, and a nitrogen line which also was attached to pressure/vacuum reading devices was installed. The Teflon® bushing around the stir shaft was fully tightened, and a vacuum was slowly applied to the system to $8.4 \times 10^4$ Pa. After 10 minutes at $8.4 \times 10^4$ Pa, the pressure was reduced to about $6.7 \times 10^4$ Pa for 10 minutes and decreased by $1.7 \times 10^4$ Pa every 10 minutes (or as behavior of the resin allowed, i.e., foaming, etc.) until about $1.7 \times 10^4$ Pa. Pressure was then decreased over 10 minute intervals to $6.7 \times 10^3$ Pa, then $2.4 \times 10^3$ Pa at which time full vacuum was applied. The system remained under full vacuum (27 Pa to 66 Pa) until the torque reading rose past about 69 millivolts on a Servodyne® torquemeter. At this point, the rpm was decreased to 30 and the torque allowed to rise above 90 millivolts. The valve to the vacuum pump was closed and the kettle pressurized with nitrogen via the safety bubbler to show when the system had reached atmospheric pressure. The stirring was stopped, the metal bath lowered, and the system dismantled.

The hot kettle was set on a cork ring and the top removed. The stir shaft was lifted out and adhering resin was cut away with scissors or scraped off with a putty knife. Sublimed impurities that adhered to the upper inside portion of the kettle were cleaned off by scraping with a spatula with the kettle on its side, to avoid contamination of the remaining resin in the kettle. After this was done, the kettle was placed back into the metal bath to warm up the resin. With a large spatula-type tool the polymer was recovered as the kettle remained in the bath.

The glass transition temperature (Tg) and melting point (Tm) were determined by Differential Scanning Calorimetry at a heating rate of 25° C./min. The Tm was taken as the peak of the melting endotherm, and the Tg was taken at the midpoint of the transition, both measured on as-made polymer. The Tg was 182° C. and the Tm was 232° C. with a heat of fusion of 0.4 J/g.

The polymer obtained was melt blended in a twin screw extruder with glass spheres and TiO$_2$ to obtain a composition containing 35% by weight of glass spheres and 3% by weight of TiO$_2$. This composition was molded on a single screw injection molding machine with barrel temperatures of about 330°–350° C., to obtain standard test pieces. The tensile properties were measured (ASTM D-638 was the procedure used) and the tensile strength was 116 MPa, and tensile elongation was 1.8%. The flexural modulus (measured by ASTM D-790) was 18.2 GPa and the flexural strength was 174 MPa.

What is claimed is:

1. A thermotropic liquid crystalline polymer consisting essentially of the repeat units

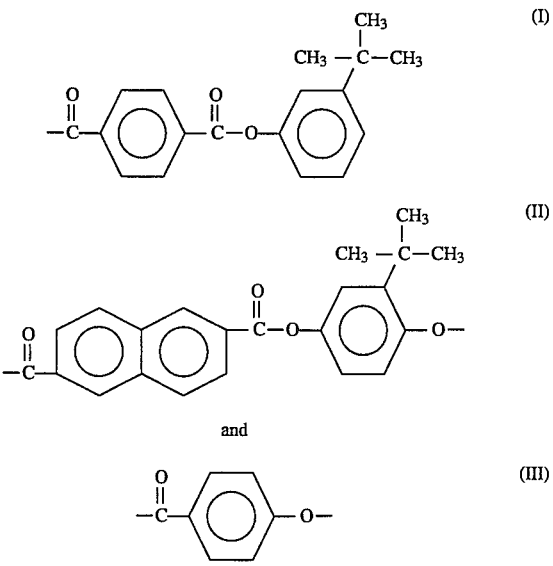

and wherein:

the molar ratio of (I):(II) is about 1:9 to about 9:1; and the molar ratio of [(I)+(II)]:(III) is about 4:1 to about 1:2.

2. A thermotropic liquid crystalline polymer as recited in claim 1 wherein the molar ratio of (I):(II) is about 4:1 to about 1:4.

3. A thermotropic liquid crystalline polymer as recited in claim 1 wherein the molar ratio of (I):(II) is about 3:1 to about 1:3.

4. A thermotropic liquid crystalline polymer as recited in claim 1 wherein the molar ratio of [(I)+(II)]:(III) is about 3:1 to about 2:3.

5. A thermotropic liquid crystalline polymer as recited in claim 2 wherein the molar ratio of [(I)+(II)]:(III) is about 3:1 to about 2:3.

6. A thermotropic liquid crystalline polymer as recited in claim 3 wherein the molar ratio of [(I)+(II)]:(III) is about 3:1 to about 2:3.

* * * * *